United States Patent Office 3,155,576
Patented Nov. 3, 1964

3,155,576
ULCER THERAPY COMPOSITION AND METHOD
OF USING SAME
Paul M. Lish, Hugh D. Bryan, and Neil H. Mercer, Evansville, Ind., assignors to Mead Johnson & Company, Evansville, Ind., a corporation of Indiana
No Drawing. Filed May 8, 1962, Ser. No. 193,301
3 Claims. (Cl. 167—55)

U.S. patent application Serial No. 193,300, filed herewith by H. D. Bryan and N. H. Mercer, is concerned with a group of novel aluminum hydroxide dioctyl sulfosuccinate complexes which have pharmaceutical advantages over prior salts of dioctyl sulfosuccinic acid such as sodium dioctyl sulfosuccinate and calcium bis-dioctylsulfosuccinate. The present invention is concerned with pharmaceutical compositions containing the above complexes in combination with antacids, and with the treatment of ulcers.

The present invention involves the discovery that aluminum hydroxide dioctyl sulfosuccinate complexes referred to above reduce gastric secretion and increase gastric emptying time on contact thereof with the intestinal mucosa. The former property is clearly of value in ulcer therapy. Advantage of the latter can be taken in alleviating ulcer symptoms by co-administration of these substances with antacids since by increasing gastric emptying time and reducing gastric secretion, the effectiveness of the antacid dose is enhanced.

More specifically then, this invention involves co-administration of a therapeutic dose of aluminum hydroxide dioctyl sulfosuccinate complex and a therapeutic dose of an antacid to a host suffering from ulcers. By co-administration is meant either administration of a unitary composition containing aluminum hydroxide dioctyl sulfosuccinate complex and an antacid or separate, concurrent, or spaced administration of these active ingredients so that their periods of pharmacologic effectiveness overlap, thereby potentiating or prolonging the effect of the antacid. Conventional sized doses of antacid and aluminum hydroxide dioctyl sulfosuccinate complex are employed. Since the aluminum complex appears to operate by means of a local contact mechanism on the intestinal mucosa, administration thereof on an empty stomach is sometimes advantageous. The dose of antacid, or a second dose of antacid alone when using a unitary composition of antacid and aluminum hydroxide dioctyl sulfosuccinate complex, may then follow at an interval of about one hour for the desired effect.

The aluminum hydroxide dioctyl sulfosuccinate complexes are administered for anti-ulcer purposes by the oral route in doses ranging from 1.0 to 400 mg. per kg. of body weight. Various types of pharmaceutical dosage formulations may be employed, including compressed tablets, chewable tablets, capsules, solutions, suspensions, etc. Compositions in dosage form as anti-secretory medications or antacid potentiators in ulcer therapy contain from 10 to 500 mg. of aluminum hydroxide dioctyl sulfosuccinate complex. The aluminum hydroxide dioctyl sulfosuccinate complex used in this invention is described in the afore-noted Bryan and Mercer application as containing from about 4.5 to 13.7% aluminum, from 4.0 to 7.3% sulfur and up to about 20% water on a weight basis and in the preferred form from 4.5 to 7.8% aluminum, from 6.0 to 7.3% sulfur and up to about 10.5% water on a weight basis. It has been found that when aluminum hydroxide is contacted in solution at pH 3.2 to 4.5 with dioctyl sulfosuccinic acid or a salt thereof in a molecular ratio of about 1:1 to 3:1, an aluminum hydroxide dioctyl sulfosuccinate complex, as described herein, is formed.

The chewable tablet is the preferred form of antacid compositions containing one of the aluminum hydroxide dioctyl sulfosuccinate complexes referred to above. Preferred compositions, including liquids, chewable tablets, compressed tablets, and coated tablets, contain from 50 to 200 mg. of aluminum hydroxide dioctyl sulfosuccinate complex and from 0.2 to 2.0 g. of antacid component per dosage unit. Conventional antacid ingredients such as calcium carbonate, magnesium carbonate, magnesium trisilicate, sodium carbonate, and aluminum hydroxide may be employed. Examples are provided hereinafter to illustrate compositions useful in practicing this invention.

In order to illustrate the effectiveness of the aluminum hydroxide dioctyl sulfosuccinate complexes as anti-ulcer agents, an experiment involving prevention of ulcers in restrained rates is described. The test drug in this experiment had a 1:1 ratio on a molecular basis of aluminum to sulfur and was found on analysis to contain 6.01% Al, 6.67% S, and 4.41% $H_2O$. It was prepared from aluminum chloride and sodium dioctyl sulfosuccinate substantially as described in copending application Serial No. 193,300.

Male or female rats of our colony weighing between 50 and 150 grams were given free access to water but restricted from food for 24 hours. Each rat was lightly anesthetized with ether prior to restraint and administration of drug. Drugs were administered intraduodenally by hypodermic syringe through a laparotomy incision.

Following drug administration, each rat was placed on a piece of galvanized wire screen, 8 inches by 11 inches. The screen was folded over the rat and stapled around the outer edges. When the rat regained consciousness in 5 to 10 minutes, the screen was stapled more closely to restrict movements as much as possible without interfering with respiration.

Stomachs of the test animals were scored for severity of ulcers six hours later as follows:

0=negative (no ulcers)
1=minimal (one to two very small ulcers)
2=average (two or more small or medium ulcers)
4=severe (one or more large and several small or medium ulcers)

The efficacy of the drug in preventing the incidence and/or severity of ulcers was judged by a number of factors including the "$ED_{50}$" values which represent that dose of drug, interpolated from log dose-response curves, which reduced the incidence of ulceration to 45 percent or which reduced the severity to a mean score of 0.9.

By means of this test, the $ED_{50}$ value relative to incidence of ulcers for the aluminum hydroxide dioctyl sulfosuccinate test compound was determined to be 185 mg./kg. and relative to severity 160 mg./kg. In the same test, atropine sulfate was found to have $ED_{50}$=5 mg./kg. as to incidence and $ED_{50}$=about 1.6 as to severity. In other words the aluminum hydroxide complex in doses of 160 to 185 mg./kg. provided the same anti-ulcer effect as 1.6 to 5.0 mg./kg. doses or atropine sulfate.

Having now described our invention in a general way, and its application in a specific ulcer test in detail, the following examples are provided to more fully illustrate aspects thereof relative to antacid compositions:

EXAMPLE 1

*Antacid Suspension*

A suspension containing 50 mg. of aluminum hydroxide dioctyl sulfosuccinate complex and 500 mg. of aluminum hydroxide-magnesium carbonate compressed gel per tablespoonful (15 ml.) is prepared from the following ingredients. The batch size described is sufficient for the preparation of 1 l. of this formulation.

| Ingredient: | Amount |
|---|---|
| Aluminum hydroxide-magnesium carbonate compressed gel [1] _____g__ | 222.2 |
| Aluminum hydroxide dioctyl sulfosuccinate complex (Example 1 of Bryan and Mercer Ser. No. 193,300) _____g__ | 3.33 |
| Sucrose _____g__ | 200 |
| Methyl p-hydroxybenzoate _____g__ | 1.20 |
| Propyl p-hydroxybenzoate _____g__ | 0.30 |
| Guar gum (Burtonite V7E) _____g__ | 6.0 |
| Sorbitol, 70% aqueous (Sorbo, Atlas Powder Co.) _____ml__ | 200 |
| Sodium saccharin _____g__ | 1.0 |
| Sodium cyclamate _____g__ | 2.0 |
| Monosodium glutamate _____g__ | 1.0 |
| Ethyl vanillin _____g__ | 1.0 |
| F.D.C. Yellow No. 5 _____g__ | 0.056 |
| Lemon-lime flavor (51.196/A, Firmenich) _____ml__ | 0.10 |
| Pineapple flavor (51.351/A, Firmenich) _____ml__ | 0.10 |
| Ethyl alcohol, U.S.P. _____ml__ | 8.00 |
| Distilled water, q.s. 1000.00 ml. | |

[1] Reheis Company, Inc., Berkeley Heights, N.J., $Al_2O_3$, 40%; MgO, 8%; $CO_2$, 20%; $H_2O$, 75–85% ($Al_2O_3$, MgO, and $CO_2$ analyses based on dried mixture).

The sucrose, guar gum, sorbitol, sodium saccharin, sodium cyclamate, monosodium glutamate, and ethyl vanillin are dissolved in 300 ml. of water which is first heated to 60° C. The solution is then cooled to 30° C. and the color is added thereto. The compressed aluminum hydroxide-magnesium carbonate gel is then placed in a vessel of suitable size and the above vehicle is added thereto with mixing. The powdered aluminum hydroxide dioctyl sulfosuccinate complex and the methyl p-hydroxybenzoate, propyl p-hydroxybenzoate and the flavors dissolved in the alcohol are added to the mixture, which is then diluted to 1 l. with distilled water. The ingredients are all thoroughly dispersed by massing the suspension through a mechanical homogenizer as the final step.

EXAMPLE 2

*Chewable Antacid Tablet*

An antacid tablet containing 50 mg. of aluminum hydroxide dioctyl sulfosuccinate complex and 400 mg. of aluminum hydroxide-magnesium carbonate co-dried gel per tablet is prepared as follows. The batch size given is sufficient for 1000 tablets.

*Step A.*—A granulation is prepared from the following ingredients, dried overnight, and crushed so as to pass through a No. 16 screen.

| Ingredient: | Amount |
|---|---|
| Aluminum hydroxide-magnesium carbonate co-dried gel [1] _____g__ | 400 |
| Mannitol _____g__ | 450 |
| Glycine _____g__ | 150 |
| Sodium saccharin _____g__ | 1.0 |
| Sodium cyclamate _____g__ | 10.0 |
| Sodium chloride _____g__ | 3.0 |
| Gelatin, 30% aqueous solution (dry basis)_g__ | 10.0 |
| Water _____ml__ | 310 |

[1] Reheis Company, Inc., Berkeley Heights, N.J., $Al_2O_3$, 40%; MgO, 8%; $CO_2$, 20%; $H_2O$, 8.3%.

*Step B.*—The dried and screened granulation is then thoroughly blended with the following ingredients.

| Ingredient: | Amount, g. |
|---|---|
| Aluminum hydroxide dioctyl sulfosuccinate complex (Example 1 of Bryan and Mercer, Ser. No. 193,300) _____ | 50.0 |
| Silicic acid _____ | 1.50 |
| Talc _____ | 34.0 |
| Magnesium stearate _____ | 35.0 |
| Peppermint oil (P, Firmenich) _____ | 15.0 |
| Spearmint oil, spray dried (Firmenich) _____ | 3.0 |

The blend is then subdivided and pressed into tablets at a weight of 1.173 g. in conventional equipment employing a ⅝ inch round, flat-faced, beveled edge die.

The following examples are illustrations of compositions of the present invention which are designed for immediate release of the aluminum hydroxide dioctyl sulfosuccinate complex with delayed release of the antacid material. These preparations are compression-coated tablets containing the aluminum hydroxide dioctyl sulfosuccinate complex in the coating and the antacid in the core. The tablets are of such a size that they cannot pass through the pyloric sphincter and enter the intestinal tract until the coating has been released and the core of antacid material disintegrated. Thus, the tablet is retained in the stomach until after the coating containing the aluminum hydroxide dioctyl sulfosuccinate complex has been eroded or dissolved and passed into the intestine. The aluminum hydroxide dioctyl sulfosuccinate-containing tablet coat is of such a nature that rapid disintegration thereof is facilitated, while the antacid core is relatively more resistant to disintegration.

EXAMPLE 3

The following ingredients are employed in preparing a tablet which serves as a core for the compression-coated tablet.

| Ingredients: | Amount, g. |
|---|---|
| Aluminum hydroxide-magnesium carbonate co-dried gel) _____ | 300 |
| Gelatin _____ | 6 |
| Corn starch _____ | 35 |
| Talc _____ | 7 |
| Magnesium stearate _____ | 2 |
| Total _____ | 350 |

The antacid material is moistened with the gelatin as a 10% solution in water. The resulting mass is screened, dried, rescreened, and blended with the corn starch, talc, and magnesium stearate. This granulation is then compressed as a 13/32″ round standard bi-convex tablet core. The following ingredients are then formed into a granulation to be employed in applying the compression coating.

| | G. |
|---|---|
| Aluminum hydroxide dioctyl sulfosuccinate complex (Example 1 of Bryan and Mercer, Ser. No. 193,300) _____ | 200 |
| Lactose _____ | 148 |
| Corn starch _____ | 40 |
| Talc _____ | 8 |
| Magnesium stearate _____ | 4 |
| Total _____ | 400 |

The aluminum hydroxide dioctyl sulfosuccinate complex is blended with the lactose and the blend is moistened with a paste prepared from a portion of the corn starch and a small amount of water. The resulting mass is screened, dried, and rescreened and then blended with the remaining corn starch, talc and magnesium stearate. This granulation is then employed in the final tableting step in which a compression coat is applied of sufficient thickness to provide a ½″ round standard convex coated tablet weighing 750 mg. The batch size given in this example is sufficient for 1000 tablets.

EXAMPLE 4

A compression-coated tablet similar to that described in Example 3 is prepared by the procedure of Example 3 employing the following ingredients to prepare the core:

|  | G. |
|---|---|
| Aluminum hydroxide dried gel | 225 |
| Magnesium trisilicate | 75 |
| Gelatin | 6 |
| Corn starch | 35 |
| Talc | 7 |
| Magnesium stearate | 2 |
| Total | 350 |

EXAMPLE 5

The following materials are substituted in the procedure of Example 3 for the preparation of the antacid core. The compression coating is applied in the same manner and using the ingredients specified in that example.

|  | G. |
|---|---|
| Calcium carbonate precipitated | 300 |
| Gelatin | 6 |
| Corn starch | 35 |
| Talc | 7 |
| Magnesium stearate | 2 |
| Total | 350 |

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. The process which comprises orally administering to a host suffering from ulcers a therapeutically effective amount of an antacid and a dose of from 1 to 400 mg. per kilogram of body weight of said host of an aluminum hydroxide-dioctyl sulfosuccinate complex containing from about 1 to about 3 molecular proportions of aluminum hydroxide per molecular proportion of dioctyl sulfosuccinate and on a weight basis from 4.5 to 13.7 percent aluminum, from 4.0 to 7.3 percent sulfur, and up to about 20 percent water, such that the periods of pharmacological effectiveness of said antacid and said aluminum hydroxide dioctyl sulfosuccinate complex overlap.

2. A composition in dosage unit form adapted for oral administration containing from 10 to 500 mg. of an aluminum hydroxide dioctyl sulfosuccinate complex comprising from about 1 to about 3 molecular proportions of aluminum hydroxide per molecular proportion of dioctyl sulfosuccinate and on a weight basis from 5 to 13.7 percent aluminum, from 4.0 to 7.3 percent sulfur and up to about 20 percent water and a therapeutic amount of a pharmaceutically acceptable antacid.

3. The composition of claim 2 containing 50 to 200 mg. of aluminum hydroxide dioctyl sulfosuccinate complex and from 0.2 to 2.0 g. of a pharmaceutically acceptable antacid.

References Cited in the file of this patent
UNITED STATES PATENTS

| 2,880,136 | Gore | Mar. 31, 1959 |
| 2,903,397 | Heilig | Sept. 8, 1959 |

OTHER REFERENCES

U.S. Dispensatory, 25th edition, 1955, Lippincott Co., Phila., Pa., pp. 56–58.